T. E. ADAMS.
ELECTRIC ARC LAMP.
APPLICATION FILED APR. 16, 1909.
1,032,263.
Patented July 9, 1912.
7 SHEETS—SHEET 1.
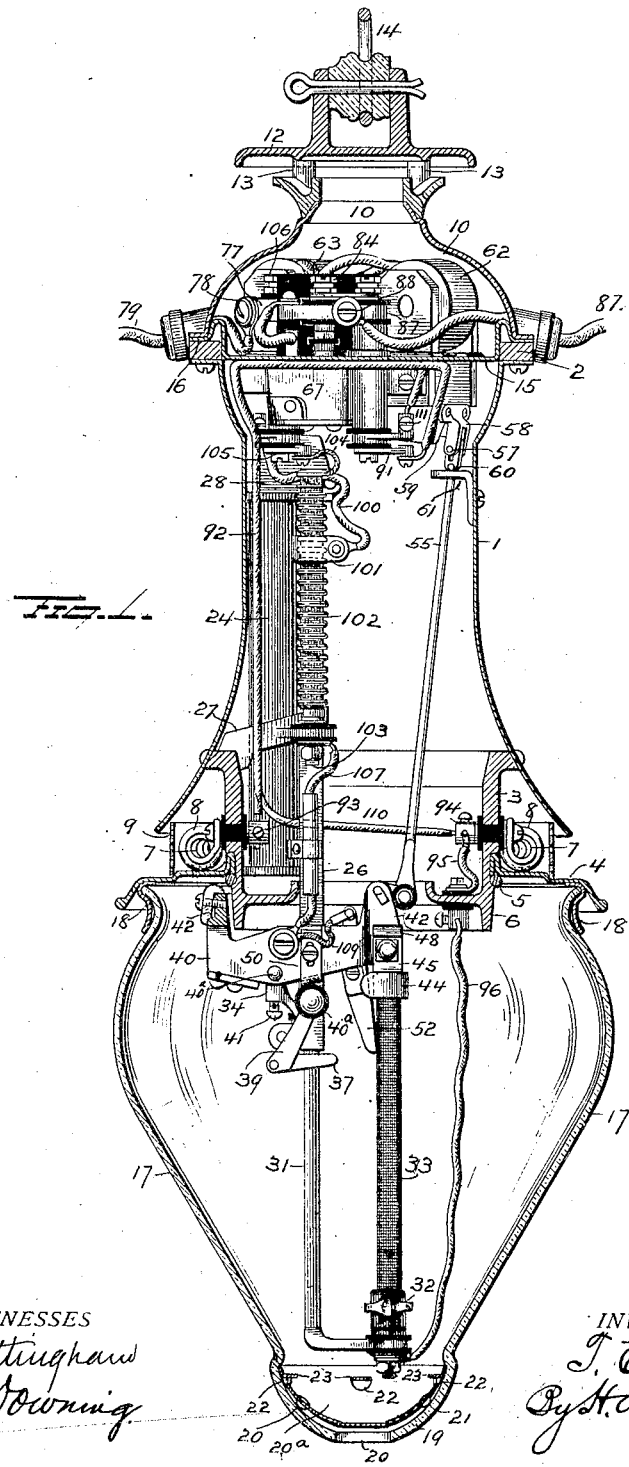
WITNESSES
E. D. Nottingham
G. F. Downing
INVENTOR
T. E. Adams
By H. A. Seymour
Attorney

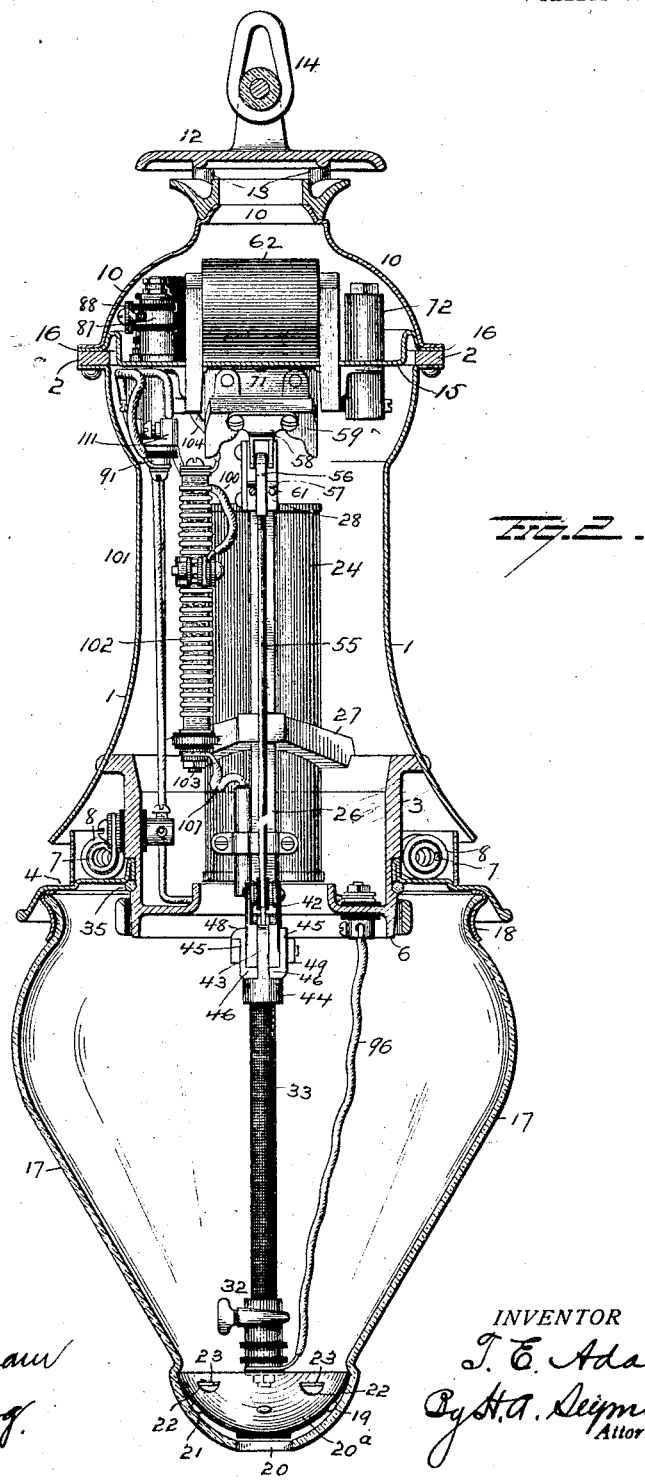

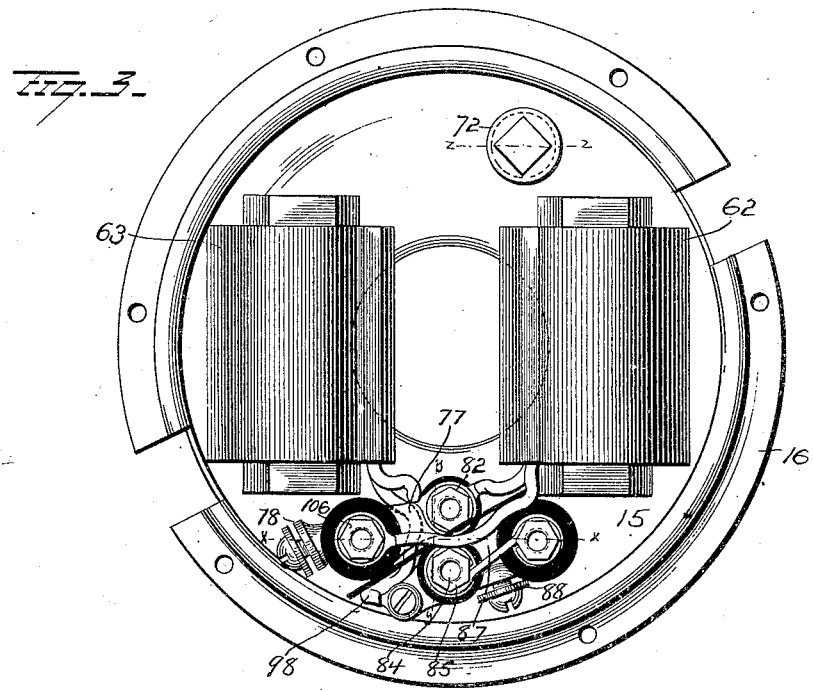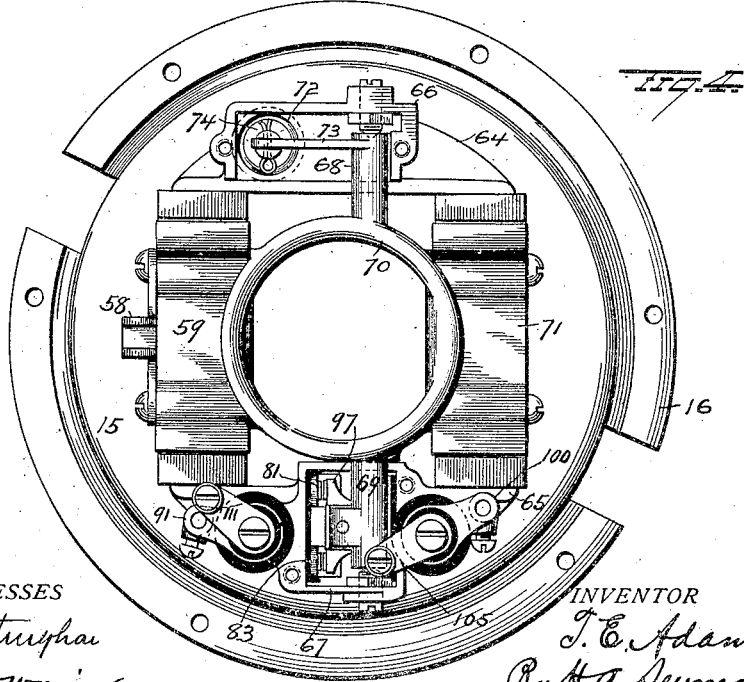

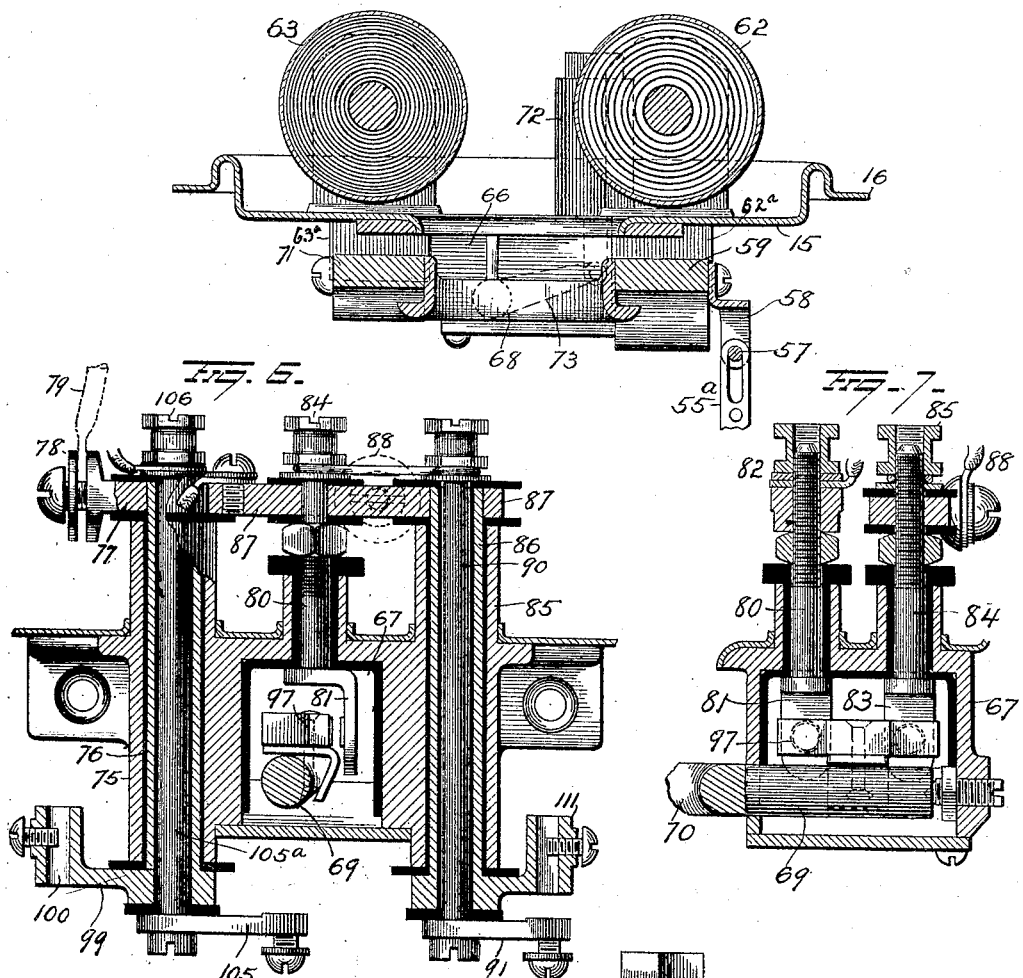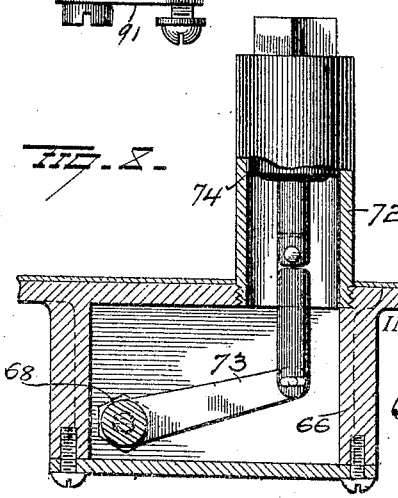

T. E. ADAMS.
ELECTRIC ARC LAMP.
APPLICATION FILED APR. 16, 1909.
1,032,263.
Patented July 9, 1912.
7 SHEETS—SHEET 5.
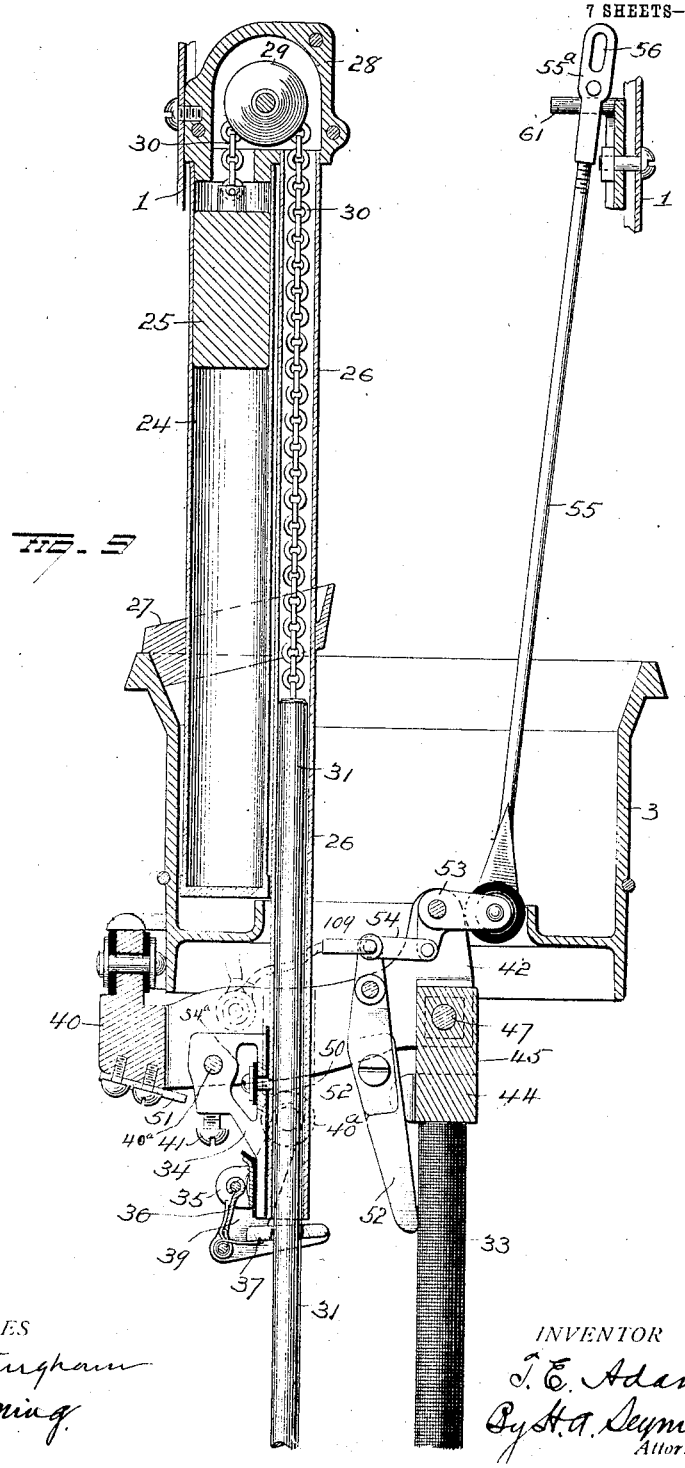

T. E. ADAMS.
ELECTRIC ARC LAMP.
APPLICATION FILED APR. 16, 1909.
1,032,263.
Patented July 9, 1912.
7 SHEETS—SHEET 6.
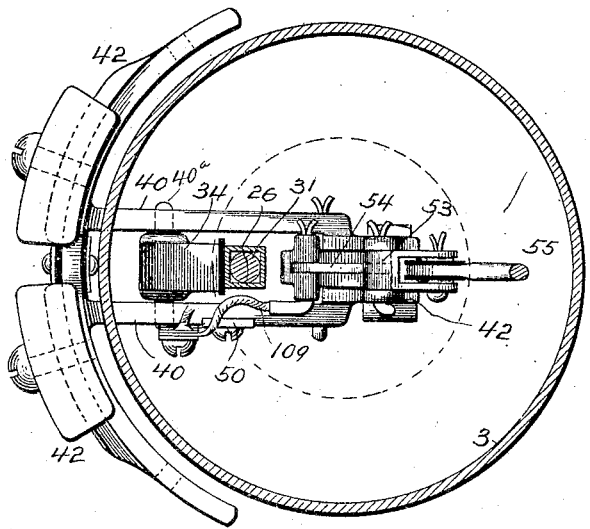
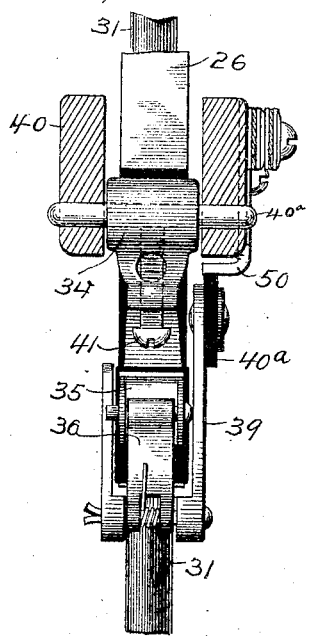
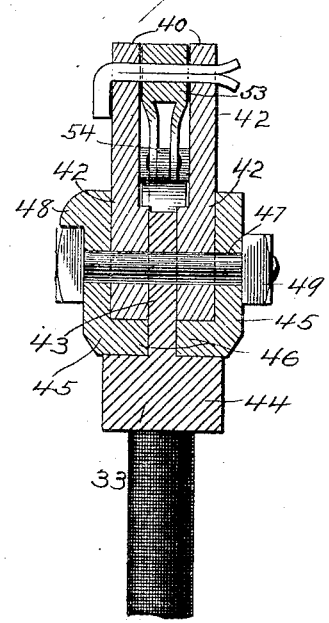
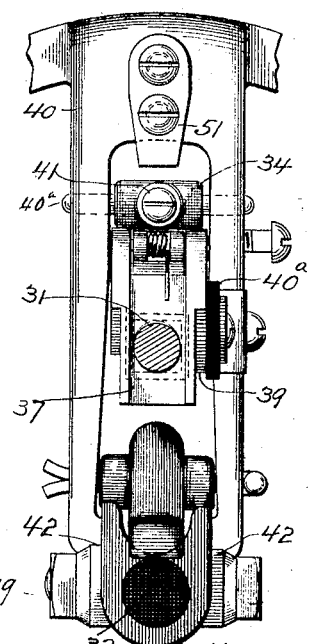
WITNESSES
E. J. Nottingham
G. J. Downing
INVENTOR
T. E. Adams
By H. A. Seymour
Attorney T. E. ADAMS.
ELECTRIC ARC LAMP.
APPLICATION FILED APR. 16, 1909.
1,032,263.
Patented July 9, 1912.
7 SHEETS—SHEET 7.
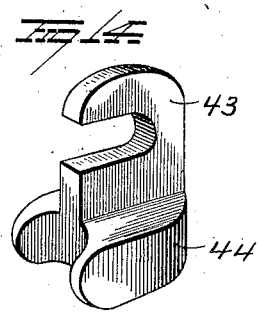
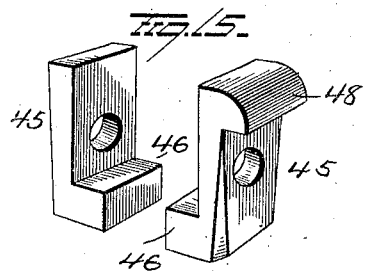
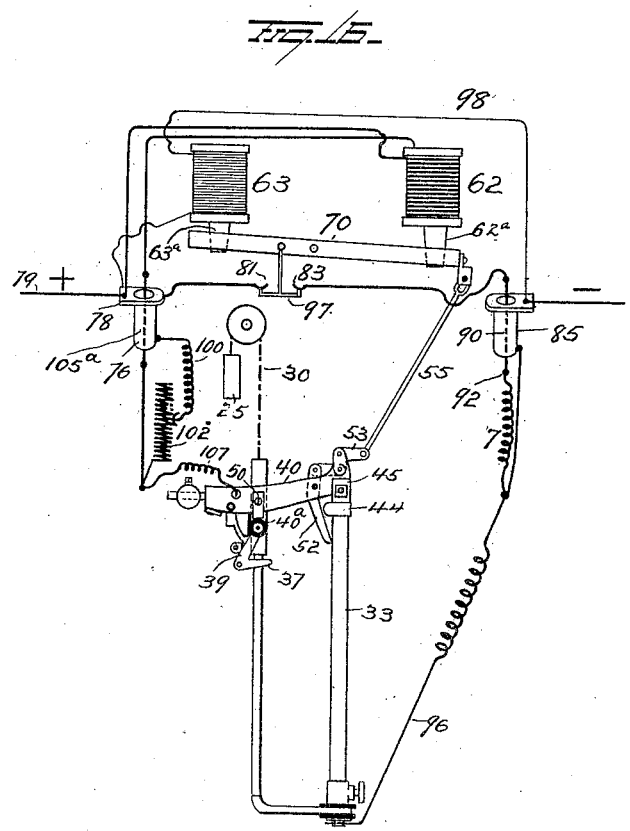

UNITED STATES PATENT OFFICE.

THOMAS EDGAR ADAMS, OF CLEVELAND, OHIO, ASSIGNOR TO THE ADAMS-BAGNALL ELECTRIC COMPANY, OF CLEVELAND, OHIO.

ELECTRIC-ARC LAMP.

1,032,263.  Specification of Letters Patent.  Patented July 9, 1912.

Application filed April 16, 1909. Serial No. 490,316.

*To all whom it may concern:*

Be it known that I, THOMAS E. ADAMS, of Cleveland, in the county of Cuyahoga and State of Ohio, have invented certain new and useful Improvements in Electric-Arc Lamps; and I do hereby declare the following to be a full, clear, and exact description of the invention, such as will enable others skilled in the art to which it appertains to make and use the same.

This invention relates to improvements in electric arc lamps,—one object of the invention being to so construct an electric arc lamp that it will operate accurately with the use of metallic electrodes.

A further object is to so construct an electric arc lamp employing metallic electrodes, that it can be successfully started regardless of the degree of conductivity at the contact of the electrodes when the current first enters the lamp.

A further object is to provide simple and efficient starting devices for an arc lamp employing metallic electrodes.

A further object is to so construct starting devices for an arc lamp employing metallic electrodes, that the end of the lower electrode will be initially heated to increase its conductivity in case its electrical contact with the upper electrode is poor when current first enters the lamp.

A further object is to so construct starting means for an arc lamp employing metallic electrodes, that a preliminary arc will be established in proximity to the end of the lower electrode if the electrical contact of the latter with the upper electrode is poor.

A further object is to improve the construction and mode of application of a metallic upper electrode in an arc lamp employing metallic electrodes.

A further object is to construct an arc lamp in such manner that the establishing and regulating of the arc shall be effected by manipulation of the upper electrode, and so that the feeding will be effected by movement of the lower electrode.

A further object is to provide simple and efficient devices for manipulating the electrodes in the starting, regulating and feeding operations of the lamp.

A further object is to so construct the mechanism of an electric arc lamp that when the lower electrode has been consumed, the regulation of the upper electrode will cease and the lamp be automatically cut out.

A further object is to construct the lamp in such manner that the casing will afford extensive surface for the collection of deposits from fumes and gases, and enable the operating mechanism to withstand the effect of such deposits.

A further object is to provide means to collect hot metal globules or slag dropping from the upper end of the lower electrode and prevent the same from breaking the globe or escaping from the latter.

A further object is to improve the construction of an electric arc lamp in other respects as will be hereinafter pointed out.

With these objects in view, the invention consists in certain novel features of construction and combinations of parts as hereinafter described and specified in the claims.

In the accompanying drawings:—Figure 1 is a vertical sectional view of an electric arc lamp embodying my invention; Fig. 2 is a sectional view at right angles to Fig. 1; Fig. 3 is a plan view of the regulator mechanism; Fig. 4 is a bottom view of the same; Fig. 5 is a transverse sectional view; Figs. 6, 7, and 8 are sectional views on lines $x-x$, $y-y$ and $z-z$ respectively on Fig. 3. Figs. 9, 10, 11 and 12 are views showing the devices for manipulating the electrodes and Figs. 13, 14 and 15 are detail views. Fig. 16 is a diagrammatical view.

1 represents a casing preferably of sheet metal, to the upper end of which a cast metal ring 2 is secured and within the lower portion of the shell or casing 1, a depending bowl 3 having a central opening, is secured. A globe cover 4 encircles the bowl 3 and is held in place by means of a wire ring 5 located in a groove above a flange 6 depending from the bowl. The cover also serves to support a resistance coil 7 which is utilized in the operation of the lamp as hereinafter explained. The resistance coil is supported in insulating rings 8 under the overhanging lower end of the casing 1 and said resistance is inclosed by a perforated ring 9 supported on the cover 4.

The top of the shell or casing 1 is provided with a cap or hood 10 secured to the ring 2. The cap or hood is provided with an opening 11 in its top and over this opening, a plate 12 is supported by means of short posts 13. Suitable suspending devices 14 for the lamp are carried by the plate 12. A platform 15 having a central opening, is located at the top of the casing for supporting the electro-magnetic controlling mechanism as hereinafter explained and a flange 16 of this platform is disposed between the ring 2 and the cap or hood 10 so that it will be secured in place by means of the same fastening devices which secure the hood to said ring.

A globe 17 is adapted to inclose the electrodes of the lamp and is provided with a holder 18 to be removably connected with the cover 4 in any suitable manner. The globe may have a general pear shape with a partly spherical portion 19 at its lower end, having an opening 20 in its bottom.

With the construction of casing, hood and globe as above described, a free circulation of air will be permitted upwardly through the globe, casing and hood, and this circulation of air will operate to convey gases and fumes generated at the arc, upwardly through the casing and permit their exit through the opening in the top of the hood. Gas or fumes from an arc between metallic electrodes will cause a deposit within the casing, which latter, in effect constitutes an expansion chamber for the gases or fumes and affords an extensive surface on which the deposit may collect. The casing thus constituting a large passage for the escaping gases, will not soon become clogged with deposit as is liable to occur when small flues are employed.

With the use of metallic electrodes (such, for instance, as a lower electrode of ferro-titanium), a sort of slag is formed at the arc, and this slag drops from the top of the lower electrode in the form of globules. By providing the globe with a partly spherical portion 19 at its lower end, these globules of slag will engage the inner surface thereof at such an angle as to avoid breaking the globe, and the partly spherical surface will direct such slag into a pan 20ª supported in the bottom of the globe, thus preventing the same from escaping through the bottom of the globe. The pan 20ª is provided on its bottom with projections 21 to prevent the same from closely fitting the bottom of the spherical portion 19 and closing the opening therein, and to further guard against too greatly restricting the passage of air into and through the globe, the pan 20ª is provided with openings 22, which are overhung by lips 23 to prevent the escape of slag through said openings.

Located within the shell or casing 1 in close proximity to one wall thereof, is a casing 24 for the accommodation of a weight 25, and alongside this weight casing, a tube 26, preferably having an angular external configuration, is disposed. The weight-casing and tube are held in place by a bracket 27 secured thereto and resting on the bowl or lamp floor 3. A box 28 is located over the weight casing 24 and tube 26 and in this box, a pulley 29 is mounted. A chain 30, attached at one end to the weight 25, passes over the pulley 29 and at its other end, this chain is connected with the upper end of a rod 31 movable longitudinally in the tube 26. The rod 31 is adapted to depend some distance below the lower end of the tube 26 and at its lower end is provided with a holder 32 for the lower electrode 33, which, in the present instance is preferably of the metallic type containing ferro-titanium.

In proximity to the lower end of the tube 26 a bracket 34 is secured thereto by means of a screw 34ª, said bracket being suitably insulated from the tube, and this bracket supports insulated ears 35 with which a link 36 is pivotally connected. With the other end of the link 36, a clutch 37 is pivotally connected and provided with an opening for the passage of the rod 31. A spring 38 bearing against the link 36 and clutch 37, serves to cause the latter to normally bind against the rod 31 to prevent movement of the latter and the lower electrode carried thereby. The clutch 37 is provided with an arm 39 carrying an insulating disk or roller 40ª at its free end to be engaged by a device hereinafter described, for moving the clutch and releasing the lower electrode rod 31. When such release occurs, the weight 25 will be free to move the rod upwardly to effect the feeding of the lower electrode.

A yoke 40 (which may consist of an iron casting) is pivotally supported between its ends by the bracket 34 at the lower end of the tube 26 and the pivot pin 40ª for this yoke may be normally retained in position by means of a screw 41 in the bracket 34. The yoke 40 embraces the tube 26 without contact therewith and at its rear end, said yoke is provided with weighted arms 42 which may be made to conform to the contour of the depending flange of the lamp floor or bowl 3, said weighted arms being thus disposed under and protected by the globe cover 4. The respective members of the yoke 40 are made at their free ends with jaws 42, between which the hook-shaped shank 43 of an upper electrode 44 is disposed,—the latter being made in the form of a short, compact block and preferably composed of an alloy of copper and tin. To secure the upper electrode in place and permit its ready removal, renewable plates 45 are disposed alongside the jaws 42 of the yoke 40 and said plates are provided with lugs 46 to be disposed between the head of the electrode and the free ends of said jaws. A bolt 47 passes through the plates 45, the jaws 42 and the shank of the electrode and provided at one end with a head to engage a lug 48 on one of the plates 45 to prevent the bolt from turning. The other end of the bolt 47 is threaded for the reception of a nut 49. The shank of the upper electrode can be thus firmly clamped between the jaws 42 of the yoke 40 by means of devices which are readily renewable.

A finger or plate 50 is adjustably secured to the yoke 40 in position to engage the arm 39 of the clutch 37 for tripping the latter to permit the feeding of the lower electrode as hereinafter described. A finger 51 is secured to the outer portion of the yoke in position to engage the bracket 34 for limiting the upward movement of the yoke and the upper electrode carried thereby.

With the use of metallic electrodes, poor electrical contact of one with the other is sometimes caused on account of corrosion or from other cause, and the prompt and successful starting of the lamp has been thus rendered difficult with lamps as commonly constructed. To overcome this difficulty, I provide devices which will insure the proper starting of the lamp even though the electrical contact of the electrodes may be so poor as to render the formation of an arc between them impossible when the current first enters the lamp. A starting finger 52 is pivotally supported near its upper end between the members of the yoke 40 and is of such length that it can engage the lower electrode some distance below the upper end of the latter, and in order that the portion of the finger which engages the electrode can be renewed when necessary, said finger is made in two parts removably secured together. A bell-crank 53 is pivoted between the upper ends of the jaws 42 of the yoke 40 and the lower arm of this bell-crank is connected, by means of a pivoted link 54 with the starting finger 52 above the pivotal support of the latter. To the other arm of the bell-crank, the lower end of a rod 55 is pivotally attached. The upper end of the rod 55 is provided with an adjustable member 55ª having an elongated slot 56 for the passage of a pin 57 which connects it with a bracket 58 secured to a vertically movable armature 59. The slot and pin connection for the upper end of the rod 55, will permit the weight of the latter to be normally exerted (when the lamp is out of circuit) to press the starting finger against the lower electrode and insure electrical contact therewith. The downward movement of the rod 55 will however, be limited by engagement of a pin 60 thereon with a stop 61 on the lamp casing, for a purpose which will hereinafter appear. It will be observed that, in order to afford proper space for the starting finger, the electrodes are disposed out of alinement with the vertical axis of the casing. When the rod 55 is moved upwardly by the electro-magnetic controlling mechanism presently to be described, it will operate first to move the starting finger 52 to move laterally away from the lower electrode and thus establish a preliminary or starting arc between said finger and electrode. The continued upward movement of the rod 55 will cause the yoke 40 to be turned on its pivotal support and the upper electrode to be raised for the purpose of establishing the normal arc between the two electrodes. The natural tendency of the preliminary or starting arc above mentioned, to travel upwardly, will result in so heating the electrodes as to render them more readily conductive, at which time the arc will forsake the starting finger and will persist between the two electrodes, thus establishing the normal working arc.

A coarse wire magnet 62 and a fine wire magnet 63 are located over the platform 15 and disposed at respective sides of the central opening in the latter. The pole pieces 62ª and 63ª of these magnets pass through the platform 15 and depend a short distance below the same. The depending pole pieces support two brackets 64—65 of non-magnetic metal and these brackets may also be secured to the bottom of the platform. The brackets 64—65 are made respectively, with housings 66 and 67 in which the respective arms 68—69 of an armature yoke 70 are pivotally mounted, said arms 68—69 being located at one side of the longitudinal axis of the armature yoke. This yoke is preferably made of brass and has secured to respective sides thereof, armatures 59 and 71 adapted to coöperate, respectively, with the pole pieces of the coarse and fine wire magnets. A dash pot 72 communicates at its lower end with the housing 66 on bracket 64 and rises through the platform 15. An arm 73 projects from the yoke-arm 68 within the housing 66 and is connected at its free end with the rod of the plunger 74 in the air pot. This construction serves to steady the movements of the armatures and parts which they actuate.

The bracket 65 is made with a sleeve 75, through which a tubular conductor 76 passes and from which it is insulated. The upper end of this conductor is provided with an arm 77 having a binding post 78 for the plus leading-in wire 79. A conductor 80 is electrically connected with the arm 77 and enters the housing 67 where it is electrically connected with a contact finger 81 located within said housing. A binding post 82 at the upper end of the conductor 80 serves to connect one terminal of the coarse wire coil and one terminal of the fine wire coil with the conductor 80 and with the arm 77, the latter, as above intimated, constituting the plus terminal of the lamp. Another contact finger 83 is located within the housing 67 and electrically connected with a conducting post 84 provided at its upper end with a binding post 85. At the opposite side of the housing 67 from the sleeve 75, the bracket 65 is made with another sleeve 85 and through this sleeve, a tubular conductor 86 passes and from which said conductor is suitably insulated. The tubular conductor 86 is provided at its upper end with an arm 87 which constitutes the negative terminal of the lamp, said arm being provided with a binding post 88 for the reception of the minus leading-in wire 89. A conductor post 90 passes through and is insulated from the tubular conductor 86 and the upper end of this post is electrically connected with the upper end of the conductor post 84. The lower end of the conductor post or rod 90 is provided with a binding post 91 for the reception of one end of a conductor 92 within the lamp casing. The other end of the conductor 92 is connected with one end of the resistance coil 7 by means of a binding post 93 within the bowl 3 of the lamp. A binding post 94 connected with the other end of the resistance coil 7 and the binding post 94 is connected, by means of conductors 95—96 with the lower electrode holder.

The arm 69 of the armature yoke 70 has pivotally attached thereto, a contact block 97 adapted to span the contact fingers 81 and 83, and as the armature yoke is pivotally supported at one side of its longitudinal axis, or nearer to armature for the fine wire magnet than to the armature for the coarse wire magnet, the weight of the last-mentioned armature will cause the yoke to be so disposed (when no current is passing through the lamp) as to cause the block 97 to electrically connect the fingers 81—83 and thus close the circuit in which the circuit closer thus formed, is included.

From the above description and by inspection of the diagrammatical view Fig. 16, it will be seen that normally, a closed cut-out circuit exists between the lamp terminals and that this circuit includes the circuit closer above described and the resistance coil 7.

It has been hereinbefore stated that one end of the coil of the fine-wire magnet is connected with the plus terminal arm 77. The other terminal of this coil is connected by a conductor 98, with the negative terminal arm 87, so that the coil of said fine-wire magnet is included in a constantly closed circuit which shunts the arc, as clearly shown in the diagram, Fig. 16.

The lower end of the tubular conductor 76 in sleeve 75 (with which conductor the plus terminal of the lamp is connected) is provided with a binding post 99 for the reception of a conductor 100, the other end of which latter is connected with an adjustable contact sleeve 101 on a resistance coil 102. The resistance coil 102 is wound upon but insulated from a metal rod 103 supported by but insulated from the bracket 27 and at its lower end, the resistance coil 102 is electrically connected with said rod. The upper end of the rod 103 is connected, by means of a short conductor 104, with a binding post 105 at the lower end of a conductor post 105ª which passes through (but insulated from) the tubular conductor 76. The upper end of the conductor post 105ª is provided with a binding post 106, by means of which a terminal of the coil of the coarse wire magnet is connected, the other terminal of said coil being connected, as before stated, with the plus terminal arm 77. The lower end of the rod 103 is connected, by means of a conductor 107, with the yoke 40 which carries the upper electrode and said yoke is electrically connected, by means of a conductor 109, with the starting finger 52. The binding post 94 with which one end of the resistance 7 is connected, is also connected by means of a conductor 110 with a binding post 111 at the lower end of the tubular conductor 86 with which latter the minus terminal arm 87 is electrically connected.

From the above description and inspection of the Diagram Fig. 16, it will be seen that one end of the coarse wire coil is connected with the plus terminal of the lamp, and the other end of said coil is connected with the upper electrode, while the lower electrode is connected with the negative terminal of the lamp,—the coil of the coarse wire magnet being thus disposed in series with the electrodes when the lamp is in operation. It will also be seen that the adjustable resistance 102 is arranged across the terminals of the coil of the coarse wire magnet for the purpose of providing means whereby the length of the arc may be controlled.

The lamp operates as follows:—When the current first enters the lamp, it will find two paths exclusive of the fine-wire shunt magnet; one through the cut-out circuit including the circuit closer and the resistance 7, and the other circuit, through the coil of the coarse wire magnet; (the amount of current through the coarse wire coil being governed by the adjustable resistance 102) and the upper and lower electrodes to the negative terminal of the lamp. If the lamp be not trimmed, the main current will traverse the first mentioned circuit including the circuit closer and the resistance 7, but in the Diagram Fig. 16 it is assumed that the lamp has been trimmed, and hence two circuits will be established in parallel. One of these circuits includes the magnet 62 and the electrodes, and the other circuit includes the circuit closer 81—83—97 and the resistance 7. The relative resistances of these parallel circuits are such that the magnet 62 will be energized sufficiently to move the armature lever far enough to open the parallel circuit including the resistance 7 but not sufficiently to operate the starting finger. As soon as the circuit including the resistance 7 shall have been thus opened, the full current will flow through the other parallel circuit. The coarse wire magnet being now further strengthened by the current previously in the cut-out circuit, will continue to raise its armature and cause the separation of the starting finger from contact with the lower electrode. If the conductivity of the contact between the upper and lower electrodes is good, no arc will appear between the starting finger and the lower electrode, but if the conductivity of such contact of one electrode with the other is poor, a preliminary or starting arc will appear between the lower electrode and starting finger and will continue even after the upper separates from the lower electrode. The tendency of this preliminary or starting arc will be to travel upwardly and will soon heat the contact surfaces of the electrodes, thus lowering the resistance until the arc will forsake the starting finger and become established in the normal position between the upper and lower electrodes, because the contact between the heated electrodes will offer less resistance to the passage of the current than will be offered by the preliminary arc between the starting finger and the lower electrode,—it being understood that as soon as the preliminary arc forsakes the starting finger, the electrodes will be separated to establish a normal arc between them.

The fine wire shunt magnet operates in the control of the lamp, in controlling the feed as in the well known type of differential regulators.

It will be observed that the establishing and regulation of the arc is accomplished by manipulating the upper electrode, but that the feeding is accomplished by the lower electrode. Thus, the upper electrode will be caused to regulate downwardly until the yoke 40 trips the clutch, when the latter will operate to release the rod 31 and permit the weight to raise the lower electrode, thus causing the latter to be fed upwardly to maintain the continuity of the arc. When the lower electrode has been consumed, the upper electrode cannot be further regulated downwardly lower than the stop 61 will permit, the latter operating to prevent the starting finger from touching the lower electrode. The coarse wire magnet will now be deprived of current and the armature yoke will therefore be permitted to rock and close the cut-out circuit through the resistance.

Having fully described my invention what I claim as new and desire to secure by Letters-Patent, is:—

1. In an electric arc lamp, the combination with means for carrying a lower electrode, of a pivoted yoke for carrying the upper electrode, a pivoted starting finger carried by the yoke and depending below the same to engage the lower electrode, and means operating to first move the starting finger independently of the yoke from the lower electrode and then move the yoke to separate the upper from the lower electrode.

2. In an electric arc lamp, the combination with a carrier for the lower electrode, of a pivoted yoke provided with upper electrode holding means, a starting finger pivoted between its ends to said yoke and depending therefrom sufficiently to engage the lower electrode below its upper end, and means connected with said starting finger for moving the latter from the lower electrode and then raising the free end of the pivoted yoke to separate the upper from the lower electrode.

3. In an electric arc lamp, the combination with a lower electrode carrier, of a pivoted yoke provided with upper electrode holding means, a starting finger pivoted between its ends to said yoke and depending therefrom sufficiently to engage the lower electrode below the upper end of the latter, a bell-crank having one arm connected with said starting finger, a rod connected with the other arm of the bell-crank, and electromagnetic means for actuating said rod to first move the starting finger away from the lower electrode and then raise the yoke to separate the upper from the lower electrode.

4. In an electric arc lamp, the combination with a lower electrode, of a yoke pivotally supported between its ends and having one end weighted, the free ends of the members of said yoke constituting jaws, an upper electrode held by said jaws, means for raising said yoke to separate the upper from the lower electrode, and means for feeding the lower electrode.

5. In an electric arc lamp, the combination with a lower electrode carrier, of pivotally supported yoke having jaws at the free ends of its members for the reception of the upper electrode, a starting finger pivoted between its ends to the yoke and depending therefrom sufficiently to engage the lower electrode below the upper end of the latter, a bell-crank pivoted between the jaws of the yoke, a connection between one arm of the bell-crank and said starting finger, and means connected with the other arm of the bell-crank for separating the starting finger from the lower electrode and then raising the yoke to separate the upper from the lower electrode.

6. In an electric arc lamp, the combination with a lower electrode carrier and the armature of a regulator magnet, of a pivoted yoke provided at one end with holding means for an upper electrode, a pivoted starting finger carried by said yoke and depending therefrom sufficiently to engage the lower electrode below the upper end of the latter, a bell-crank pivoted to the yoke and having one arm connected with the starting finger, a rod connected with the other arm of the bell-crank, and a lost motion connection between said rod and the armature of the regulator magnet.

7. In an electric arc lamp, the combination with a lower electrode and an armature of a regulator magnet, of a pivoted yoke, an upper electrode carried by said yoke, a starting finger carried by the yoke and depending therefrom sufficiently to engage the lower electrode below its arcing end, a bell-crank pivoted to the yoke and having one arm connected with the starting finger, a rod connected at one end with the other arm of said bell-crank and at its upper end with the armature of the regulator magnet, a projection on said rod, and a fixed stop to be engaged by said projection to limit the downward movement of the yoke carrying the upper electrode when the lower electrode has been consumed.

8. In an electric arc lamp, the combination with a lower electrode carrier, of a pivoted yoke having jaws at the free ends of its members, an upper electrode having a shank to enter between said jaws, means for securing said upper electrode in place, a lower electrode, and means for moving the yoke to separate the upper from the lower electrode.

9. In an electric arc lamp, the combination with a frame, of a yoke pivotally supported thereby and having jaws at the free ends of its members, an upper electrode having a shank to enter between said jaws, blocks disposed against said jaws and having lugs to enter between the ends of the jaws and the body of the electrode, a removable bolt passing through the blocks, the jaws and the shank of the electrode, and a holder for a lower electrode to coöperate with said upper electrode.

10. In an electric arc lamp, the combination with a pivoted member carrying an upper electrode, and an electro-magnetic regulator having its movable member connected with said pivoted member, of a vertically movable rod provided with a lower electrode holder, a lower electrode, a weight connected with said rod for moving it upwardly, a clutch engaging said rod, and an arm on said clutch in position to be tripped by the pivoted member which carries the upper electrode and effect the feeding of the lower electrode to maintain the arc.

11. In an electric arc lamp, the combination with a pivoted yoke carrying an upper electrode, and an electro-magnetic regulator having its movable member connected with said yoke, of a vertically movable rod provided with a lower electrode holder, a lower electrode, a weight connected with said rod for moving it upwardly, a clutch engaging said rod, and an arm on said clutch in position to be tripped by the yoke which carries the upper electrode and effect the feeding of the lower electrode to maintain the arc.

12. In an electric arc lamp, the combination with a frame, a tube and a casing supported in the same, and a pivotally supported yoke carrying an upper electrode, of a rod vertically movable in said tube and provided with a lower electrode holder, a lower electrode, a weight in said casing, a pulley at the top of the casing, a chain passing over said pulley and connected with said weight and the vertically movable rod, a clutch for said rod, an arm on the clutch in position to be tripped by said yoke, and electro-magnetic means for controlling the movements of said yoke to move the upper electrode in establishing and regulating the arc and control the lower electrode to maintain the arc.

13. In an electric arc lamp, the combination with a frame, a casing therein, and a tube secured to said casing and depending from the lamp frame, of a vertically movable rod in said casing and depending below the same, a lower electrode holder at the lower end of said rod, a weight in the casing within the lamp frame, a pulley over said casing, a chain passing over said pulley and connected at its respective ends with the weight and the vertically movable rod, a clutch supported by said tube and engaging the vertically movable rod, a pivotally supported yoke, an upper electrode carried by said yoke, an arm on the clutch to be engaged by said yoke, and electro-magnetic means for controlling the movements of said yoke.

14. In an electric arc lamp, the combination with a frame, a tube secured thereto and depending therefrom, a vertically movable rod in said tube provided at its lower end with a lower electrode holder, a weight connected with said rod for raising the same and the lower electrode holder, and a bracket secured to said tube, of a clutch for said rod pivotally supported by said bracket, said clutch having a trip arm, a weighted yoke pivotally supported by said bracket, an upper electrode carried by said yoke, an adjustable finger carried by said yoke to engage the trip arm of the clutch, and electro-magnetic devices for controlling the operation of said yoke.

15. In an electric arc lamp, the combination with a frame and a platform in the upper portion thereof, of electro-magnets supported by said platform, brackets supported by the poles of said magnets, an armature yoke having armatures for said magnets and provided with arms mounted in said brackets, an air pot cylinder projecting from one of said brackets, a plunger in said air pot cylinder, an arm on one of the yoke arms and connected with said plunger, carriers for electrodes, and devices connected with one end of the armature yoke for controlling said electrode carriers.

16. In an electric arc lamp, the combination with a frame, a platform therein, and carriers for electrodes, of electro-magnets supported by said platform, brackets secured to the poles of said magnets and provided with housings, an armature yoke provided with armatures for said magnets and having arms mounted in said housings, contact fingers in one of said housings, a contact block carried by the adjacent yoke and said contact fingers and block constituting a circuit closer included in a cut-out circuit between the lamp terminals, a resistance included in said cut-out circuit, and devices connected with the armature yoke for controlling the operation of the electrode carriers.

17. In an electric arc lamp, the combination with a frame, electro-magnetic regulator mechanism, and electrode carriers, of two brackets provided with housed bearings for the movable member of the regulator mechanism, one of said brackets made with sleeves and carrying the various terminal connections of the lamp, and devices connected with the movable member of the regulator for controlling the operation of the electrode carriers.

In testimony whereof, I have signed this specification in the presence of two subscribing witnesses.

THOMAS EDGAR ADAMS.

Witnesses:
G. C. PAXTON,
JOHN R. ORPUTT.